R. O. KING.
COMPOSITE RAFTER.
APPLICATION FILED JUNE 7, 1912.
1,094,074.
Patented Apr. 21, 1914.
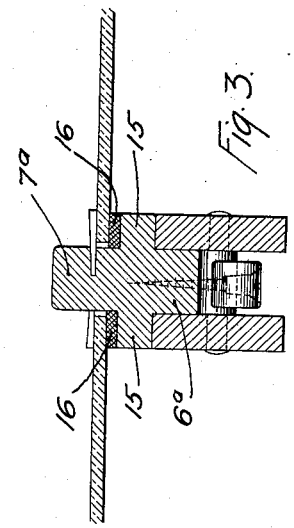
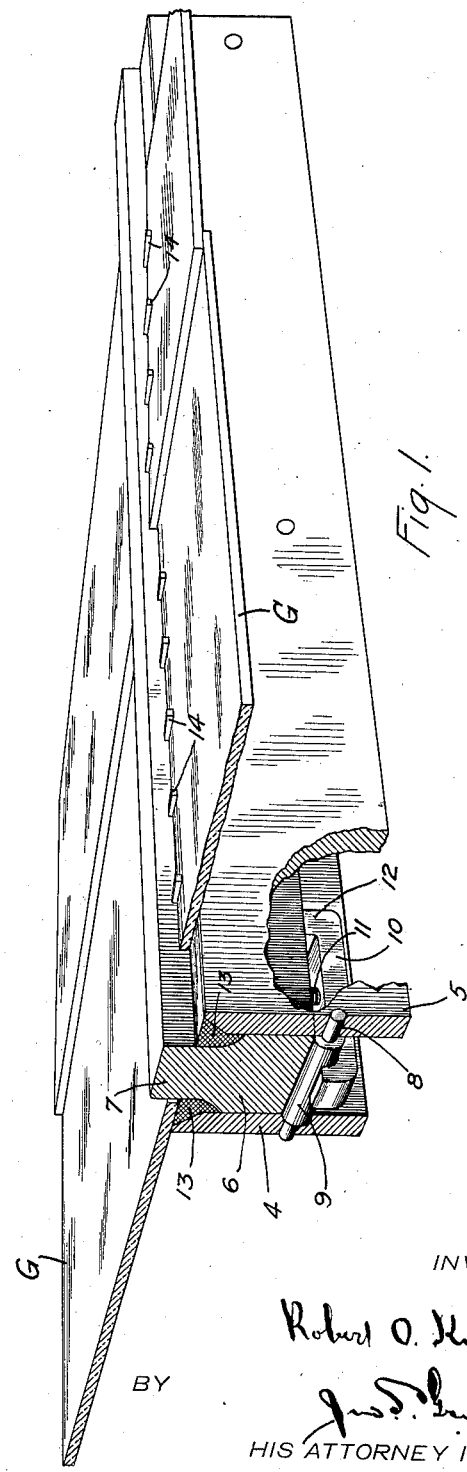
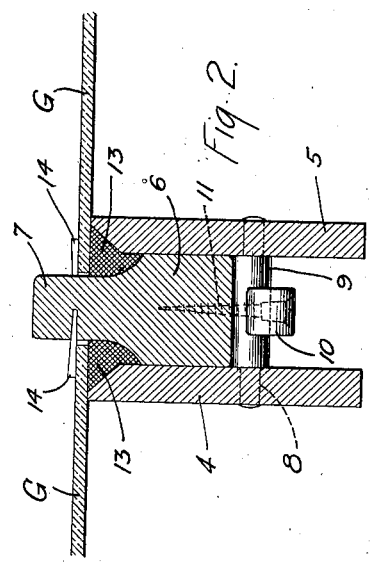
WITNESSES:
INVENTOR.
Robert O. King
BY
HIS ATTORNEY IN FACT.

UNITED STATES PATENT OFFICE.

ROBERT O. KING, OF NORTH TONAWANDA, NEW YORK.

COMPOSITE RAFTER.

1,094,074.  Specification of Letters Patent.  Patented Apr. 21, 1914.

Application filed June 7, 1912. Serial No. 702,267.

*To all whom it may concern:*

Be it known that I, ROBERT O. KING, a subject of the King of Great Britain, and a resident of North Tonawanda, in the county of Niagara and State of New York, have made a new and useful Invention in Composite Rafters, of which the following is a specification.

This invention relates to composite sash bars or rafters particularly adapted for use in green house construction, but applicable for use in other connections.

An object of this invention is to produce a cheap yet satisfactory composite bar or rafter, and this as well as other objects I attain in the constructions shown in the single sheet of drawings accompanying and forming a part of this application.

In the drawings: Figure 1 is a view in perspective of a composite bar or rafter embodying this invention. Fig. 2 is a cross-sectional view of the same; and Fig. 3 is a cross-sectional view of a modified form of composite bar or rafter embodying this invention.

In Figs. 1 and 2 the composite bar consists preferably of two flat iron bars 4 and 5 arranged on opposite sides of a central wood bar 6 cut away at its top and which projects above the tops of the bars 4 and 5 to form a nailing strip 7. The iron bars 4 and 5 are riveted together by means of rivets 8 which may either be formed with a central enlarged portion 9 which serves as a spacer, or the rivets may be surrounded with a short length of tube to form a spacer. The wood bar 6 is securely held between said bars 4 and 5 by means of clamps 10. These clamps are screwed to wood bars 6 by means of wood screws 11 and are formed in the nature of a shallow U, one end, 12, of each of which bears against the under side of bar 6, while the other ends embrace the central portions of rivets 8. It will be seen that this makes an extremely secure structure which is cheap and which may be quickly assembled. The inner upper edges of bars 4 and 5 are beveled as shown in Figs. 1 and 2 and these bevels, together with the upper reduced portion of central wood bar 6 form putty grooves or channels on opposite sides of nailing strip 7. In use these channels will be filled with putty 13 above the tops of the side bars 4 and 5, and the glass G will rest on the putty and be secured to the bar in the well known manner by means of the glazing nails 14.

In the modification shown in Fig. 3 the central wood filler member is formed in the nature of a cross, the lower part 6ª serving as the filler, the upper part 7ª as the nailing strip and the two side arms 15 which rest on the tops of the side irons serving as supports for the oppositely disposed layers of putty 16.

Having thus described my invention, what I claim is:

1. A composite rafter or bar comprising parallel irons, a spacer riveting said irons together, a nailing strip between said irons and extending beyond the tops thereof, and a clamp secured to said strip at an intermediate point thereof and having one end engaging said strip and the other end engaging said spacer.

2. A composite rafter or bar comprising parallel flat irons, a filling strip between said irons and extending beyond the tops thereof to form a nailing strip, rivets below said filling strip securing said irons together, and clamps attached to said strip, at points intermediate their ends, each clamp engaging said strip at one end only, and engaging one of said rivets.

3. A composite rafter or bar comprising parallel flat irons, rivets having a central spacing portion for securing said irons in spaced parallel relation, a filler strip between said irons and resting on said rivets, and extending beyond the tops of said irons to form a nailing strip, and clamps screwed to said filling strip, one end of each clamp engaging said strip and the other end engaging one of said spacing portions.

4. A composite rafter or bar comprising flat parallel irons, spacers securing said irons together in spaced parallel relation, a nailing strip projecting above said irons and extending downwardly in contact with said spacers, and substantially U-shaped clamps engaging said spacers and secured to said strip, each clamp being so located that it subtends and engages one spacer, and engages said strip at one end only.

In testimony whereof, I have hereunto subscribed my name this 31st day of May, 1912.

ROBERT O. KING.

Witnesses:
M. A. JORDAN,
R. W. HAMMOND.

Copies of this patent may be obtained for five cents each, by addressing the "Commissioner of Patents, Washington, D. C."